United States Patent
Brettshneider et al.

[11] 3,930,478
[45] Jan. 6, 1976

[54] SYSTEM FOR THE DETOXICATION OF EXHAUST GASES

[75] Inventors: Johannes Brettshneider, Ludwigsburg-Pflugfelden; Heinrich Knapp, Leonberg-Silberberg, both of Germany

[73] Assignee: Robert Bosch G.m.b.H., Stuttgart, Germany

[22] Filed: Sept. 12, 1973

[21] Appl. No.: 396,410

[30] Foreign Application Priority Data
Sept. 15, 1972  Germany.......................... 2245491

[52] U.S. Cl. ...................... 123/122 H; 123/122 AA
[51] Int. Cl.² ..................................... F02M 31/00
[58] Field of Search......... 123/122 H, 122 AA, 133; 261/50 A, 145, 44 R

[56] References Cited
UNITED STATES PATENTS

| | | | |
|---|---|---|---|
| 1,448,008 | 3/1923 | Smith | 123/122 H |
| 1,889,270 | 11/1932 | Thomas et al. | 123/122 H |
| 1,945,178 | 1/1934 | Carter | 123/122 H |
| 1,947,040 | 2/1934 | Kirby | 123/122 H |
| 2,395,264 | 2/1946 | Gardner | 123/122 H |
| 2,473,808 | 6/1949 | Mallory | 123/122 H |
| 2,702,029 | 2/1955 | Burton | 123/140 MP |
| 2,874,944 | 2/1969 | Doiza | 261/36 A |
| 3,007,463 | 11/1961 | Goldsmith | 123/140 MP |
| 3,061,286 | 10/1962 | Mennesson | 261/36 A |
| 3,539,159 | 11/1970 | Handtmann | 261/50 A |
| 3,669,423 | 6/1972 | Hohsho | 261/DIG. 69 |

FOREIGN PATENTS OR APPLICATIONS

| | | | |
|---|---|---|---|
| 46-2604 | 3/1966 | Japan | 123/140 MP |
| 1,232,416 | 4/1959 | France | 123/122 H |
| 399,394 | 10/1942 | Italy | 123/122 H |
| 192,794 | 2/1923 | United Kingdom | 123/122 A |

*Primary Examiner*—Charles J. Myhre
*Assistant Examiner*—R. H. Lazarus
*Attorney, Agent, or Firm*—Edwin E. Greigg

[57] ABSTRACT

An exhaust gas-detoxicating system for an externally ignited internal combustion engine having at least one air intake suction tube wherein a fuel/air mixture is produced by metering into said tube fuel from a fuel metering device, and wherein the fuel air mixture, before its entry into a cylinder of the engine, can be deviated through a heated-up bypass of at least one suction tube by means of a flap valve being disposed in said suction tube and being controllable in dependence on characteristic engine data, is improved by providing, in combination, measuring means for detecting the amount of air flowing through the said suction tube and means for controlling the flap valve in dependence on the detected air amount. Preferably, the measuring means comprise a Venturi constriction in the suction tube, a pneumatic-mechanical converter, and means actuating the converter in dependence on the pressure difference between the air pressure upstream, and the air pressure in the Venturi constriction at the narrowest cross sectional area of the latter.

10 Claims, 1 Drawing Figure

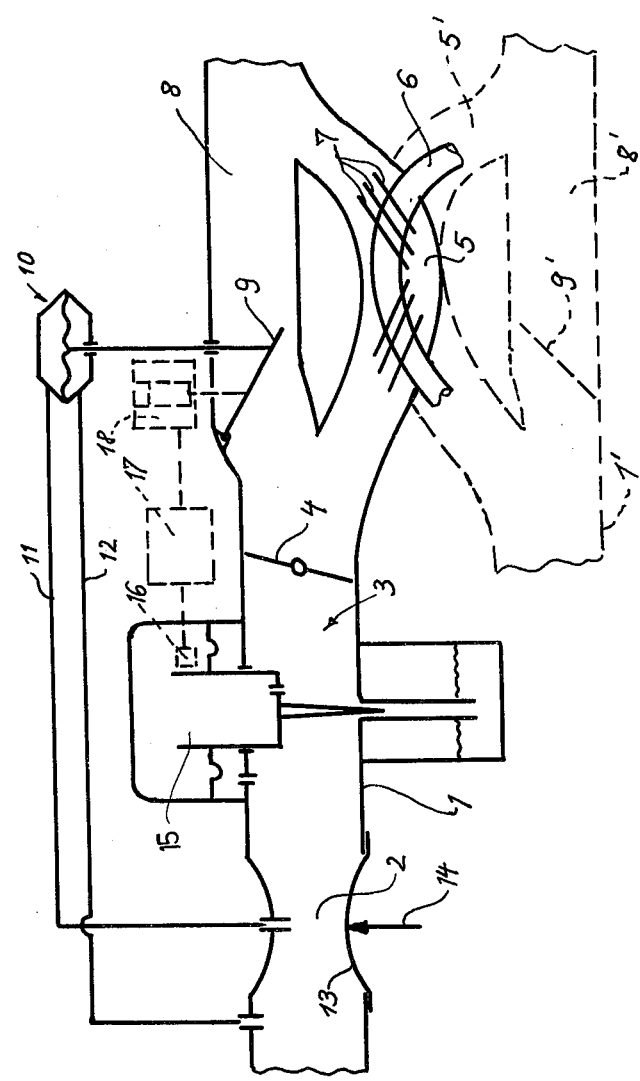

SYSTEM FOR THE DETOXICATION OF EXHAUST GASES

BACKGROUND OF THE INVENTION

The invention relates to an exhaust gas-detoxicating system for externally ignited internal combustion engines wherein the fuel/air mixture can be conducted, before entering the engine cylinder, through a heated-up bypass of the suction pipe for air-intake of the engine by means of a flap valve controlled as a function of an engine characteristic, which flap valve is arranged in the suction pipe and circumvented by the bypass.

In a known exhaust gas-detoxicating system of this type a flap valve directing the air/fuel mixture through the bypass is controlled in dependence on the position of the throttle valve and/or of the accelerator pedal of the engine. Thereby, the control depends on the load. However, in order to obtain a favorable exhaust gas composition, it is important, that, in the entire low speed range, a heating-up of the fuel/air-mixture takes place substantially independently of the load. Indeed, especially for low rpm's and higher load, a heating-up is desirable in order to attain favorable exhaust gas values as well as a true running of the engine.

OBJECT AND SUMMARY OF THE INVENTION

It is an object of the invention to provide a system for detoxicating exhaust gases of the type described initially, which is free from the above-described drawbacks.

This object is attained according to the invention, by a system of the type initially described comprising a flap valve which is controlled in dependence on the amount of air flowing through the suction pipe. In this manner the valve can be adjusted in accordance with fuel consumption only when the desired rpm is attained.

According to an advantageous embodiment of the invention, the air amount passing through the suction pipe is measured by means of a Venturi tube mounted in the suction pipe; the pressure difference in the Venturi tube preferably actuates a pneumatic-mechanical converter, whereby the resulting mechanical control output adjusts the position of the flap valve directly or via electrical actuating means; and, in a preferred embodiment the narrowest diameter of the Venturi is variable.

According to another advantageous embodiment of the invention, the measuring of the air amounts by a fuel-metering system is used for controlling the flap valve; preferably, an air measuring system is used which operates on the basis of a constant pressure gradient, whereby the regulating distance of the measuring device, e.g. a carburetor piston, or a deflecting plate, is a control value for adjusting the flap valve.

According to a supplementary embodiment of the invention several suction pipes acting in parallel, as in a V-engine, have a common heatable bypass.

BRIEF DESCRIPTION OF THE DRAWING

The invention will be better understood and further objects and advantages will become apparent from the ensuing detailed specification of a preferred but merely exemplary embodiment taken in conjunction with the drawing, according to which a schematic illustration of an improved system according to the present invention is shown.

DESCRIPTION OF THE PREFERRED EMBODIMENTS

In a suction pipe 1 of an internal combustion engine, a Venturi 2, an air measuring and fuel metering system 3 in the form of a carburetor operating at constant pressure and an arbitrarily operable throttle valve 4 are arranged in series. Downstream of the throttle valve 4 a bypass 5 branches from a main section 8 of suction pipe 1. Through a segment of the bypass 5 extends a heating tube 6 for the flow of hot exhaust gases therethrough, which tube 6 is equipped with heat-transfer ribs 7. In the main section 8 of suction pipe 1 which section runs parallel to the bypass 5, there is arranged a valve 9 which controls the flow of the fuel/air mixture through this section 8; when valve 9 is closed the entire fuel/air mixture must flow through the heated bypass 5.

Valve 9 is controlled in dependence on the amount of air flowing through the suction pipe 1, by means of a pneumatic converter 10 which is connected via conduits 11 and 12 with the zone of the suction pipe 1 upstream of the Venturi zone 2 and with the narrowest passage of the Venturi, respectively. Converter 10 thus adjusts the position of valve flap 9, as a function of the Venturi pressure difference detected via conduits 11 and 12. The pressure increase caused in Venturi 2 depends directly on the amount of air flowing through suction pipe 1. Valve 9 is therefore adjusted as soon as this pressure difference rises above a certain threshold, which depends on the particular cross sectional area to which the narrowest passage of the Venturi has been adjusted as well as on the air volume flowing therethrough. In order to change the pressure ratio, between these magnitudes, i.e., in order to attain that valve 9 will begin to be operative at another limit air volume, a part 13 of the tube wall constituting the Venturi is movable as indicated by arrow 14, whereby the cross-sectional area of the narrowest passage of Venturi 2 as well as the above-mentioned pressure ratio is varied.

However, the amount of air flowing through the suction tube 1 can also be measured directly at the carburetor 3. When a constant pressure carburetor is used, the amount of air passing through suction tube 1 can be measured by the movement of the carburetor piston 15 responsive to that air amount, which movement is detected by an inductive motion pickup 16, whose output signal is fed via a variable-gain amplifier 17 to the servo-motor 18 which controls the valve 9.

As has been indicated in dashed lines in the drawing, systems having, for instance, two carburetors and two parallel suction tubes, may be provided with a joint bypass 5'.

The term "converter" used in this application means a "control valve means" which convert pneumatic to mechanical energy.

Further structural details of the fuel metering system 3 are disclosed in British Patent No. 594,494, issued Nov. 12, 1947, while further structural details of the means for moving the part 13 of the tube wall constituting the Venturi are disclosed in German Offenlegungsschrift 2,038,644 laid open for public inspection on Feb. 10, 1972, and assigned to the assignee of the present application. Both the British Patent and the German Offenlegungsschrift are herein incorporated by reference.

What is claimed is:

1. In an exhaust gas-detoxicating system for an externally ignited internal combustion engine having at least one air intake suction tube in which a fuel/air mixture is produced by metering into said suction tube fuel from a fuel metering device, and wherein the fuel/air mixture, before its entry into a cylinder of said engine, can be deviated through a heated-up bypass of at least one such suction tube by means of a flap valve being disposed in said suction tube and being controllable in dependence on characteristic engine data, the improvement comprising, in combination measuring means for detecting the amount of air flowing through said suction tube and a pneumatic-mechanical converter for controlling said flap valve in dependence on the detected air amount and independently of engine load, wherein said measuring means comprise a Venturi constriction provided in said suction tube, and means for actuating said pneumatic-mechanical converter in dependence on the pressure difference between the air pressure in the narrowest cross-sectional area of said Venturi constriction and the air pressure upstream of said measuring means, and wherein said pneumatic-mechanical converter is connected directly to the flap valve.

2. The improvement as described in claim 1, further comprising means for passing hot exhaust gas from said engine through said bypass, thereby heating the latter.

3. The improvement as described in claim 1, wherein said heatable bypass is common to at least two suction tubes acting in parallel in said engine.

4. In an exhaust gas-detoxicating system for an externally ignited internal combustion engine having at least one air intake suction tube in which a fuel/air mixture is produced by metering into said suction tube fuel from a fuel metering device, and wherein the fuel/air mixture, before its entry into a cylinder of said engine, can be deviated through a heated-up bypass of at least one such suction tube by means of a flap valve being disposed in said suction tube and being controllable in dependence on characteristic engine data, the improvement comprising, in combination measuring means for detecting the amount of air flowing through said suction tube independently of engine load, and control means connected between the measuring means and the flap valve for controlling said flap valve in dependence on the detected air amount, wherein said measuring means is adapted for emitting a mechanical regulating signal and said control means comprises a converter connected to the flap valve, and electrical means for detecting the mechanical signal, generating a comparable electrical signal and applying said electrical signal to said converter which controls thereby the relative position of the flap valve.

5. The improvement as described in claim 4, further comprising means for passing hot exhaust gas from said enging through said bypass, thereby heating the latter.

6. The improvement as described in claim 4, wherein said heatable bypass is common to at least two suction tubes acting in parallel in said engine.

7. The improvement as described in claim 4, wherein said converter comprises a servo-motor, and wherein said electrical means comprises an inductive motion pickup and an amplifier, said pickup serving to detect the mechanical signal and generating the electrical signal which is amplified by the amplifier and delivered to the servo-motor to actuate said servo-motor in controlling the position of the flap valve.

8. The improvement as described in claim 1, wherein said suction tube comprises means for varying the narrowest cross sectional area of said Venturi constriction.

9. The improvement as described in claim 4, wherein said measuring means is associated with said fuel metering device.

10. The improvement as described in claim 4, wherein said measuring means comprises a carburetor piston and wherein the displacement of said piston in response to the detected amount of air serves as a regulating distance which is proportional to the mechanical signal.

* * * * *